United States Patent
Gosukonda et al.

(10) Patent No.: US 10,049,087 B2
(45) Date of Patent: Aug. 14, 2018

(54) USER-DEFINED CONTEXT-AWARE TEXT SELECTION FOR TOUCHSCREEN DEVICES

(71) Applicant: International Business Machines Corporation, Armonk, NY (US)

(72) Inventors: Karteeka Gosukonda, Austin, TX (US); Su Liu, Austin, TX (US); Kara Schrader, Austin, TX (US); Xinya Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 15/214,260

(22) Filed: Jul. 19, 2016

(65) Prior Publication Data

US 2018/0024972 A1    Jan. 25, 2018

(51) Int. Cl.
| | | |
|---|---|---|
| *G06F 3/00* | (2006.01) | |
| *G06F 17/22* | (2006.01) | |
| *G06F 3/0484* | (2013.01) | |
| *G06F 17/27* | (2006.01) | |
| *H04W 8/22* | (2009.01) | |

(52) U.S. Cl.
CPC .......... *G06F 17/22* (2013.01); *G06F 3/04842* (2013.01); *G06F 17/2705* (2013.01); *H04W 8/22* (2013.01)

(58) Field of Classification Search
CPC .......................... G06F 3/04842; G06F 17/2705
See application file for complete search history.

(56) References Cited

U.S. PATENT DOCUMENTS

| | | | |
|---|---|---|---|
| 6,891,551 B2 | 5/2005 | Keely et al. | |
| 8,890,827 B1 | 11/2014 | Nordstom et al. | |
| 8,896,552 B2 | 11/2014 | Tan et al. | |
| 9,262,535 B2 | 2/2016 | Cohen et al. | |
| 9,684,398 B1* | 6/2017 | Samuel | G06F 3/041 |
| 2008/0222567 A1 | 9/2008 | Thoresson | |
| 2009/0109182 A1 | 4/2009 | Fyke et al. | |
| 2009/0125848 A1 | 5/2009 | Koehane et al. | |
| 2009/0228842 A1 | 9/2009 | Westerman et al. | |
| 2011/0310026 A1 | 12/2011 | Davis et al. | |
| 2012/0144298 A1 | 6/2012 | Karlsson | |
| 2012/0198344 A1* | 8/2012 | Tukol | G06F 9/44505 715/735 |
| 2012/0303452 A1 | 11/2012 | Xue et al. | |
| 2013/0019208 A1 | 1/2013 | Kotler et al. | |

(Continued)

OTHER PUBLICATIONS

Anind K. Dey et al., "Towards a Better Understanding of Context and Context-Awareness", Georgia Institute of Technology College of Computing—1999, 12 pages.

(Continued)

*Primary Examiner* — Omar Abdul-Ali
(74) *Attorney, Agent, or Firm* — Kunzler, PC

(57) ABSTRACT

For one-touch user-defined context-aware text selection for touchscreen devices, an apparatus includes a processor and a memory storing code that is executable by the processor to determine a text selection context for a touchscreen device. The apparatus ascertains whether a text selection override policy is satisfied. The apparatus replaces application text selection rules with one-touch user-defined context-aware text selection rules for the determined text selection context in response to ascertaining that the text selection override policy is satisfied.

19 Claims, 10 Drawing Sheets

(56) References Cited

U.S. PATENT DOCUMENTS

| | | |
|---|---|---|
| 2013/0113804 A1 | 5/2013 | Ferman et al. |
| 2013/0305149 A1 | 11/2013 | Dimitrov et al. |
| 2014/0380248 A1 | 12/2014 | Pangasa |
| 2015/0095855 A1* | 4/2015 | Bai .................... G06F 3/017 715/863 |
| 2015/0135112 A1* | 5/2015 | Huang ................ G06F 3/0486 715/770 |
| 2015/0178289 A1 | 6/2015 | de Sousa |
| 2015/0278622 A1 | 10/2015 | Fan et al. |

OTHER PUBLICATIONS

Paul K., How to turn Touch to Search for Chrome on or off (Android), http://www.phonearena.com/news/How-to-turn-Google-on-Tap-for-Chrome-on-or-off-Android_id70252, Jun. 9, 2015.

* cited by examiner

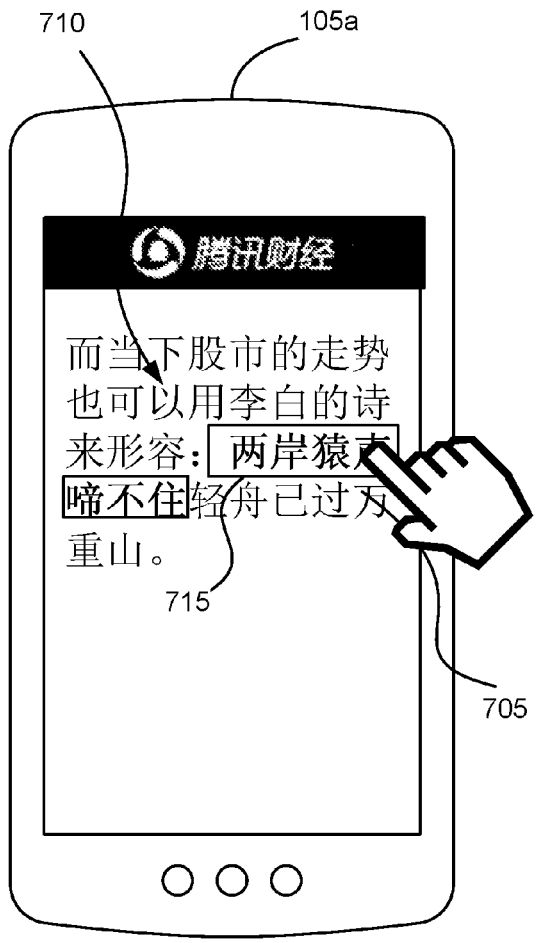

USER-DEFINED CONTEXT-AWARE TEXT SELECTION FOR TOUCHSCREEN DEVICES

FIELD

The subject matter disclosed herein relates to text selection for touchscreen devices and more particularly relates to user-defined context-aware text selection for touchscreen devices.

BACKGROUND

Applications on touchscreen devices such as phones and tablets allow for a user to select text by touching the screen. Text selection schemes may vary from application to application and from device to device. In a common text selection method, the selected text is highlighted and a start handle marks the beginning of the selected text and an end handle marks the end of the selected text.

BRIEF SUMMARY

An apparatus for one-touch user-defined context-aware text selection for touchscreen devices is disclosed. In one embodiment, the apparatus includes a processor and a memory storing code that is executable by the processor to determine a text selection context for a touchscreen device. The apparatus ascertains whether a text selection override policy is satisfied. The apparatus replaces application text selection rules with one-touch user-defined context-aware text selection rules for the determined text selection context in response to ascertaining that the text selection override policy is satisfied.

A method for user-defined context-aware text selection for touchscreen devices is disclosed. In one embodiment, the method includes determining a text selection context for a touchscreen device; ascertaining whether a text selection override policy is satisfied; and replacing application text selection rules with user-defined context-aware text selection rules for the determined text selection context in response to determining that the text selection override policy is satisfied.

A system for user-defined context-aware text selection for touchscreen devices is disclosed. In one embodiment, the system includes: a first wireless touchscreen device; a second wireless touchscreen device; a network that transfers data between the first wireless touchscreen device and the second wireless touchscreen device; and text selection code for execution by processors in the first and second wireless touchscreen devices. The processor in the first wireless device uses the code to determine a first text selection context for the first wireless touchscreen device. The processor in the second wireless touchscreen device uses the code to determine a second text selection context for the second wireless touchscreen device. The processor in the first wireless touchscreen device ascertains whether a first text selection override policy is satisfied for the first wireless touchscreen device.

The processor in the first wireless touchscreen device ascertains whether a second text selection override policy is satisfied for the second wireless touchscreen device. The processor for the first wireless touchscreen device replaces application text selection rules for the first touchscreen device with first user-defined text selection rules for the determined first text selection context in response to ascertaining that the first text selection override policy is satisfied. The processor for the second wireless touchscreen device replaces application text selection rules for the second touchscreen device with second user-defined text selection rules for the determined second text selection context in response to ascertaining that the second text selection override policy is satisfied, where at least a portion of the second user-defined text selection rules are based the first user-defined text selection rules.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7A depicts a user selecting a phrase of a literary writing in a character-based language;

FIG. 7A depicts a user-defined text selection of a corresponding phrase of the literary writing in an alphabet-based language;

DETAILED DESCRIPTION

Figure 1:
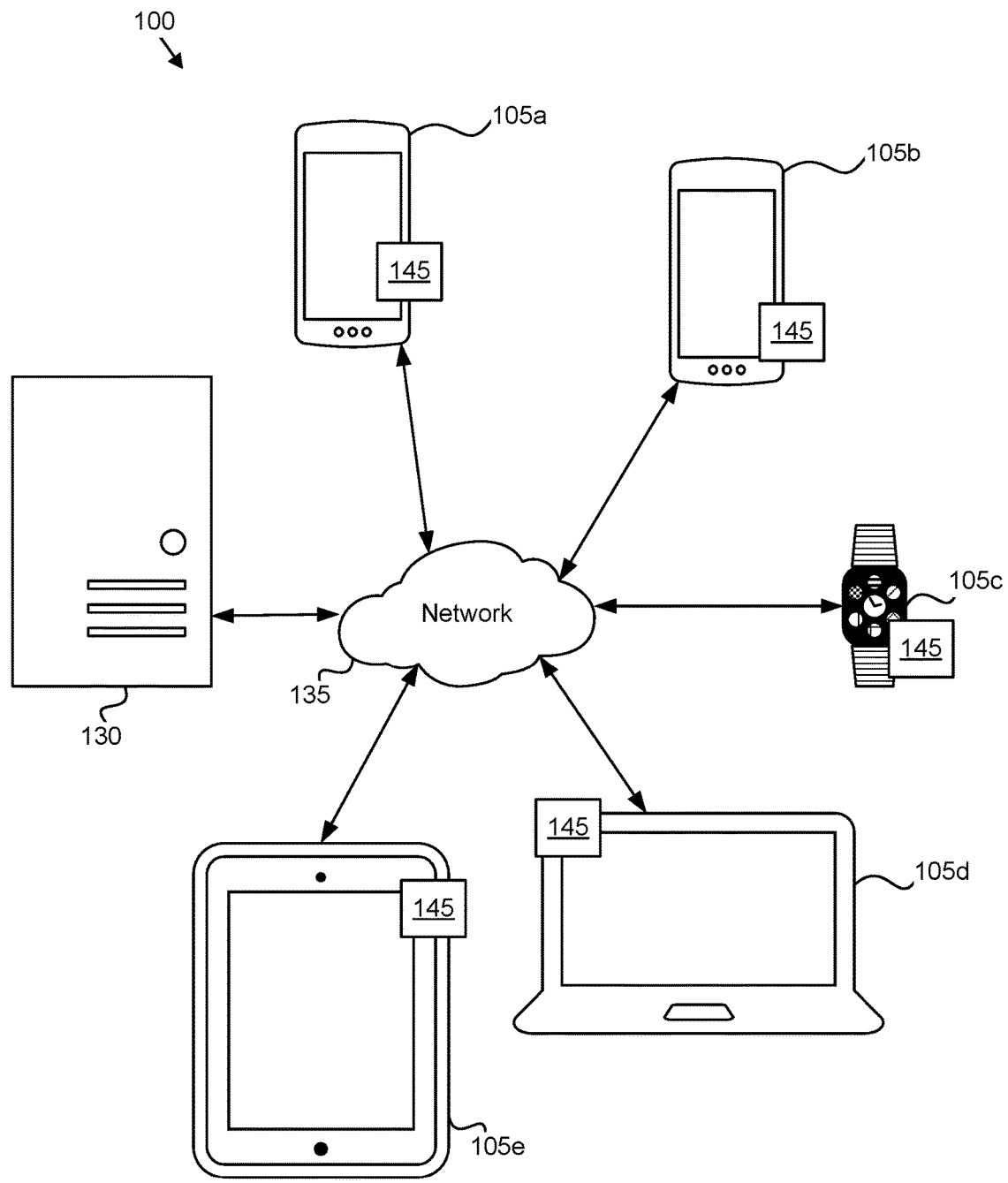
FIG. 1 is a schematic block diagram illustrating one embodiment of a system for user-defined context-aware text selection using touchscreen devices.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Blocks or elements, labelled using singular descriptions may include multiple of the blocks of objects in some embodiments. Similarly, blocks, elements, and/or objects labelled using plural form descriptions do not necessarily include a plurality of blocks, elements, and/or objects in some embodiments. Descriptions of Figures may refer to elements described in previous Figures, like numbers referring to like elements.

FIG. 1 is a schematic block diagram illustrating one embodiment of a system for user-defined context-aware text selection using touchscreen devices. It will be understood that reference to a touchscreen device 105 or touchscreen devices 105, refers to one or more of any touchscreen device 105, e.g. 105a, 105b, 105c, 105d, 105e, and so forth. Touchscreens are a common interface on smart phones (e.g. 105a, 105b) and allow a user to touch a portion of the screen, whereby if the screen includes textual content, touching the screen at a particular point allows the user to select text at the point of touching.

In one embodiment, system 100 includes one or more touchscreen devices 105, such as smart phone 105a. In one embodiment, system 100 also includes a second smart phone 105b, that may be similar to smart phone 105a. Alternatively, smart phone 105b may be a different type of smart phone with a different operating system. Other touchscreen devices 105 may be included in system 100. For example, a smart watch 105c may include a touchscreen that allows a user to select text by touching the touchscreen at a particular point. Generally, touchscreen devices 105 with smaller screens (e.g. 105a, 105b, 105c) may be more challenging for easy and accurate text selection than touchscreen devices 105 having larger screens (e.g. 105d, 105e). This may be in part because the area of contact between the user's finger in the touchscreen is relatively a larger percentage of the screen area on a small touchscreen device then on a larger touchscreen device.

Typically, larger touchscreen devices such as touchscreen laptop 105d may implement text selection mechanisms that are similar to mouse-driven text selection where a user's hand may perform actions much along the same lines as a non-touchscreen laptop user would do using a mouse. Touchscreen laptops 105d, as well as other touchscreen devices 105, are available from computer manufacturers such as Lenovo® and HP®. Commonly used operating systems found on touchscreen laptops 105d include OS X® by Apple® and Windows® by Microsoft®.

In some embodiments, system 100 may also include tablet computing devices 105e. Tablet computing devices 105e may use operating systems similar to those used by smart phone 105a and smart phone 105b. Two widely used operating systems are the IOS system by Apple® and the Android® mobile operating system by Google®. Different operating systems may have different text selection rules at an operating system level or at an application level.

Historically, text selection strategies 365 (described below in more detail with respect to FIGS. 3B and 5A) on any of the different touchscreen devices 105 on a network 135 have not influenced text selection strategies on any of the other touchscreen devices 105. Similarly, typically text selection rules are operating system specific, with different text selection rules for different operating systems. Likewise, a particular application has specific text selection rules that differ from the operating system text selection rules, it has historically applied only to the particular application.

In one embodiment, system 100 includes one or more of touchscreen device 105, e.g. smart phone 105a, smart phone 105b, smart watch 105c, touchscreen laptop 105d, and tablet computing device 105e. In some embodiments, system 100 may also include a server 130 that communicates via network 135 with one or more touchscreen devices 105 connected to it. In some embodiments, network 135 may also allow connected touchscreen devices 105 to communicate with each other without communicating with server 130.

In one embodiment, each touchscreen device 105 includes code 145 executable by a processor 310 (described below with respect to FIG. 3A). The code 145 is operable to identify a text selection context for a touchscreen device 105 to ascertain whether a text selection override policy 355 (described below with respect to FIG. 3B and 4C) is satisfied, and replace application text selection rules with user-defined context-aware text selection rules for the identified context in response to ascertaining that the text selection override policy 355 is satisfied.

While FIG. 1 depicts each of touchscreen devices 105a-105e as including code 145, it will be noted that it is not required that each touchscreen device include the code 145 for the system 100 to operate. Moreover, the code 145 may be executed independently on any of touchscreen devices 105. It may also be executed in a partially distributed, or distributed mode, meaning that parts of the code may be executed on various processors, including for example processors in server 130.

For example, smart watch 105c may execute a first portion of code 145 to enable user-defined context-aware text selection rules (also referred to as user text selection rules) to replace application text selection rules or operating system text selection rules while a second portion of code 145 may be executed on another device such as smart phone 105b or server 130. More details about the function of the code 145 with regard to text selection are described below with respect to FIGS. 3A, 3B.

Figure 2:
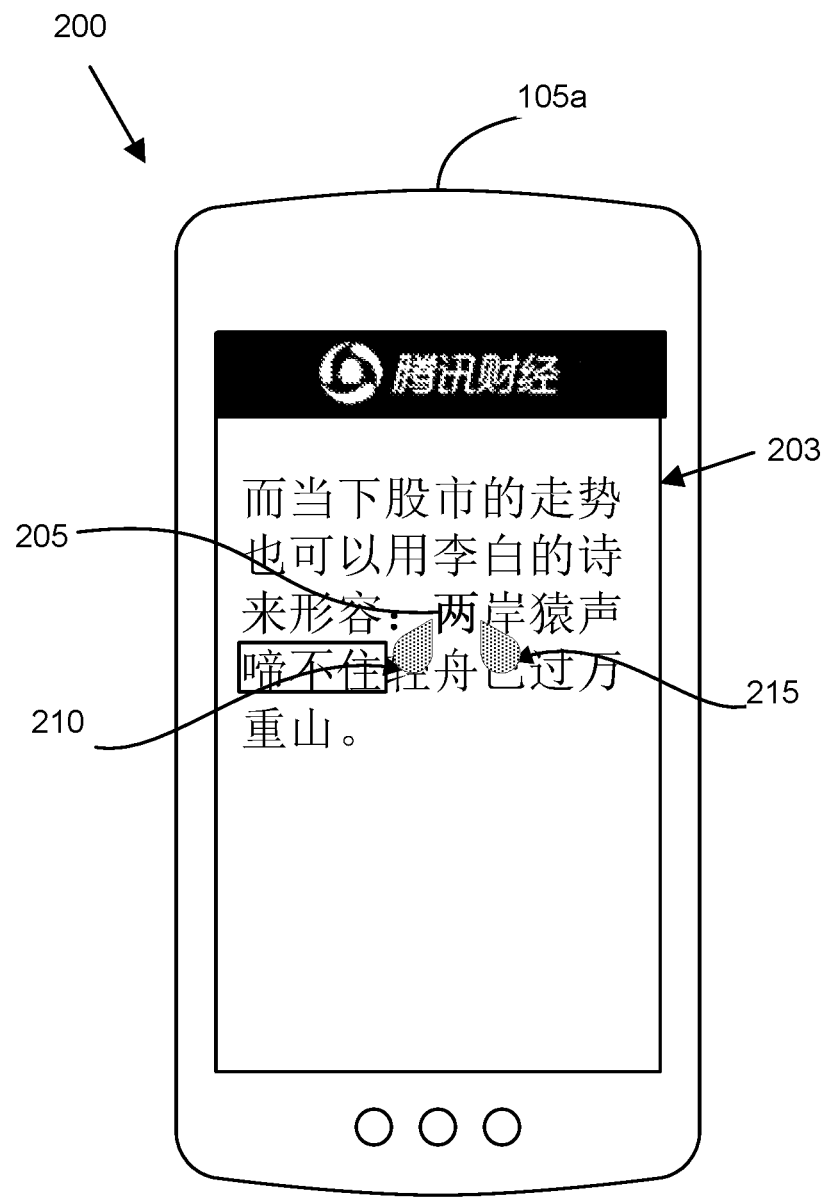
FIG. 2 depicts application text selection rules on a touchscreen device in a browser application.

FIG. 2 depicts application text selection rules which are not user-defined on a touchscreen device in a browser application. Application text selection rules may vary depending on the application and on device or operating system configuration parameters such as language. For example, FIG. 2 depicts an application 200 with a touchscreen 203 that displays a mobile web browser on smart phone 105a. The text displayed in the illustrated example includes Chinese characters. Although the website is localized to display the text in Chinese, certain characters such as the website address line or a romanized pronunciation guide to the entry are displayed in western alphabetical characters.

Each mobile device application vendor may define application specific text selection rules, for example some rules may be N-gram rules. N-gram text selection rules refer to text selection rules that allow a number in of characters or words to be selected when a touchscreen is touched. For example, unigram means that one character or word is selected, bigram means that two characters or words are selected, trigram means that three characters or words are selected, and so forth. These N-gram text selection rules typically are predefined fixed length groups of characters, or words, and are typically embedded into an application at the application level.

In the example illustrated, a user touches the touchscreen at a point above character 205. In response, the mobile web browser displays the character 205 as highlighted. Typically, the initial response to a single touch by a user on the touchscreen is not configurable within the application. In some applications, an initial response to a single touch by a user is to select a single character, i.e. a fixed-length group of one character. To select more than the fixed length number of characters, words, or letters, e.g. to select more than one character, the user drags either the left or start text selection handle 210 or the right or end text selection handle 215 in the direction of the additional characters to be selected.

One-touch as used herein refers to touching the touchscreen one time to complete the text selection operation and/or other operations included in the one-touch definition. Thus, with regard to combining text selection and highlighting with performing actions on the selected text, the examples illustrated in FIG. 2 would not be considered one-touch operations because the examples illustrated require a first touch to select the text and a second touch to complete the desired text selection. Moreover, an application 200 may apply fixed application text selection rules, e.g. unigram, bigram, trigram, and so forth without regard to the status of the mobile device, it's operating system, localization settings, status of other applications, and/or other context factors.

FIGS. 3A-B, 4A-4C, 5A-C, 6A-B, 7A-B, 8, and 9 depict improved text selection apparatuses and methods over those depicted in FIG. 2. In some embodiments, the improved apparatuses depicted in FIGS. 3A-B, 4A-4C, 5A-C, 6A-B, and 7A-B, and the methods depicted in FIGS. 8 and 9, enable a user to define context-aware text selection rules for mobile devices to replace application text selection rules. The term application text selection rules as used herein refers to text selection rules which are not both user-defined and context-aware. Application text selection rules include for example text selection rules defined by an application vendor or an operating system vendor as depicted in FIG. 2. In some embodiments, the user-defined context-aware text selection rules include one-touch text selection rules to reduce the number of times user must touch the screen to provide a regularly desired function.

For example, rather than highlighting a text selection first and displaying a pop-up menu of actions to be performed on the selected text which requires that a user touch the menu items a user may prefer to define combined text highlighting operations with text actions such as a single touch i.e. one-touch combined highlighting and searching or one-touch highlighting and translating. In some embodiments, a first one-touch user-defined context-aware rule for a first application enables a second one-touch user-defined context-aware rule to replace the default application text selection rule for a second application.

In some embodiments, user-defined text selection rules include rules of the network level so that one user operating within a network may influence the text selection rules of another user operating within the network. In some embodiments, user-defined context-aware text selection rules may include override policies that allow user to decide whether or not to apply the applications text selection rules or a user-defined context-aware text selection rules at the OS level or at the network level.

Figure 3A:
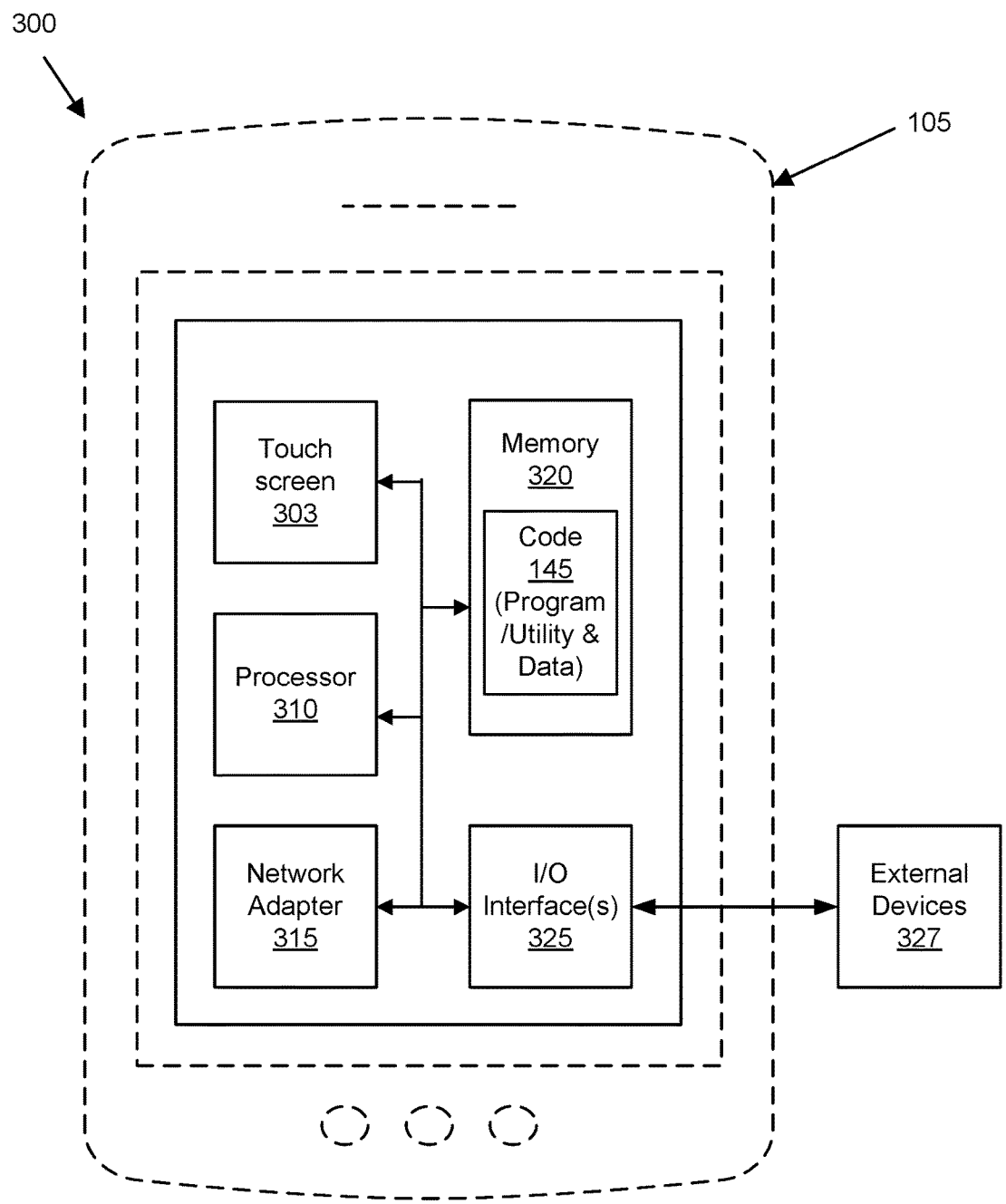
FIG. 3A is a schematic block diagram illustrating one embodiment of an apparatus for user-defined context-aware text selection using a touchscreen device.

FIG. 3A is a schematic block diagram illustrating one embodiment of an apparatus for user-defined context-aware text selection using a touchscreen. In one embodiment 300 a touchscreen device 105 that has a processor 310 and a memory 320 storing code 145 executable by the processor 310 is included. The memory 320 may be integrated memory including nonvolatile memory, static memory, or dynamic memory. The memory 320 may also include removable memory such as for example, Secured Digital® (SD®) cards or microSD® cards.

The processor 310 executes code 145 to identify a text selection context for the touchscreen device 105. In some embodiments, the processor 310 identifies the text selection context by comparing parameters monitored by a device status monitor 343 (shown in FIG. 4B), such as location 430. The processor 310 may further ascertain whether a text selection override policy is satisfied, for example, by evaluating logical expression of parameters including override policy, status of the touchscreen device, and/or applications that it is executing, result in the override policy being satisfied, i.e. result in the logical expression that is specified to satisfy the text selection override policy. Further details regarding example embodiments of a text selection override policy are provided with respect to the description of FIG. 4C.

The embodiment 300 of touchscreen device 105 further includes a touchscreen 303 that display texts and other graphical information and allows a user to select text by touching the touchscreen 303, e.g. with a finger or fingers or with a stylus. In some embodiments, the text selection is one-touch text selection meaning that the selection of text may be completed by a user touching the touchscreen 303 one time, e.g. without additional touches to move a start handle or an end handle as depicted in FIGS. 2.

The embodiment 300 further includes network adapter 315. The network adapter 315 may enable the touchscreen device walked back to communicate with other touchscreen devices 105 via network 135 through a network connection. A network connection may be a wireless network connection.

The touchscreen device 105 may further include I/O interfaces 325. For example, touchscreen device 105 may include an I/O interface such as a global positioning system (GPS) as or any other location sensor that enables touchscreen device 105 to determine its current location. In other embodiments, touchscreen device 105 include a near field communication (NFC) I/O interface, that enables touchscreen device 105 to communicate with another electronic device in close proximity. Other types of I/O interfaces 325 that enable the touchscreen device 105 to communicate with external devices 327 may include Bluetooth transceivers, wired microphone and headphone jacks, digital data transfer interfaces, and so forth.

The processor 310 may further execute code 145 to replace application text selection rules for touchscreen device 105 with user-defined one-touch user-defined context-aware text selection rules for the identified context in response to ascertaining that the text selection override policy is satisfied. More details regarding the text selection rules and the text selection override policy are described below with respect to FIGS. 5A, 5B, and 5C. Thus, in some embodiments, the I/O interfaces 325 enable touchscreen device 105 to transfer information relevant to the user's task i.e. to transfer context information that enables touchscreen device 105 to override application or operating system text selection rules with user-defined context-aware text selection rules.

Figure 3B:
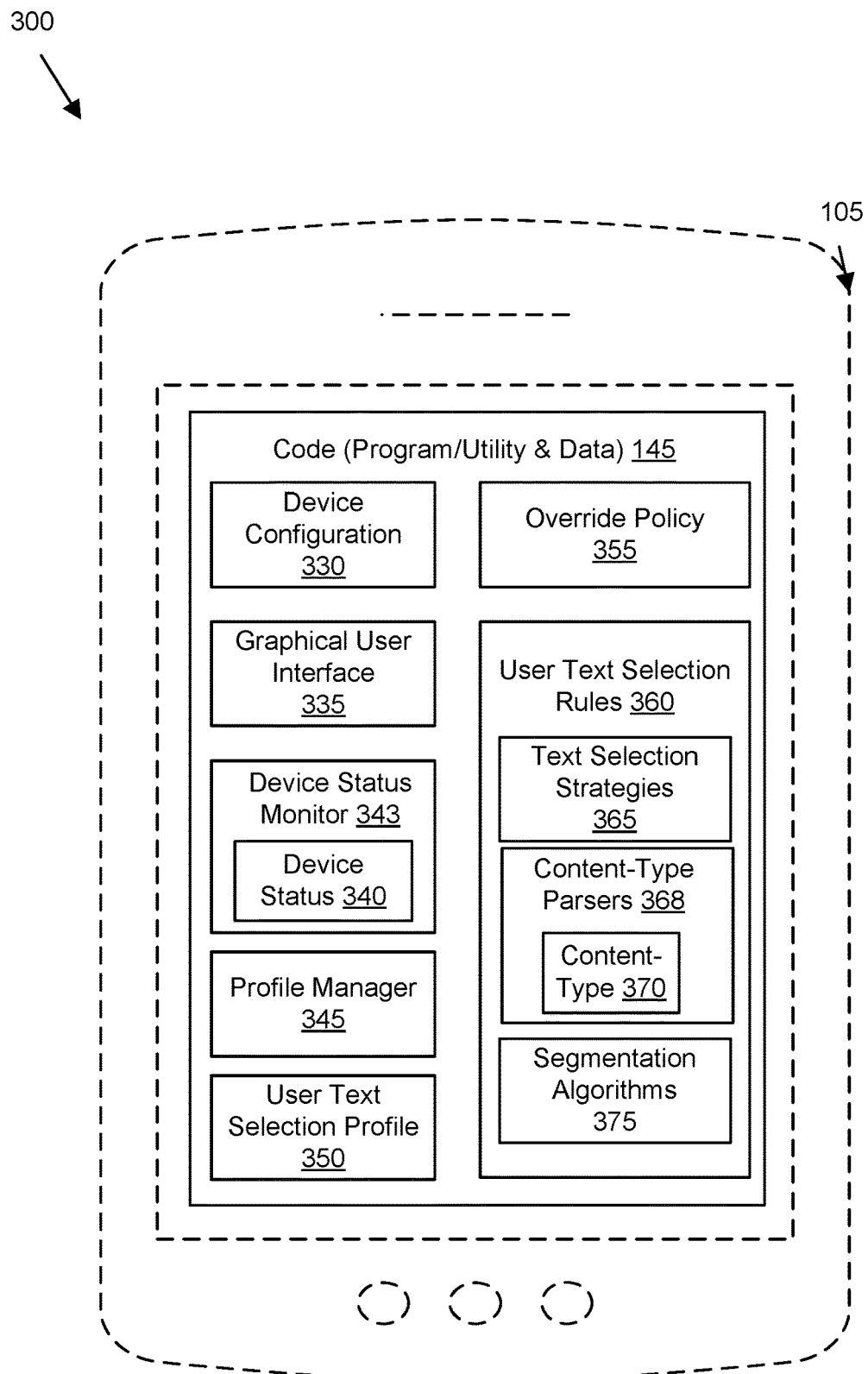
FIG. 3B is a schematic block diagram illustrating one embodiment of code for execution by the apparatus of FIG. 3A.

FIG. 3B is a schematic block diagram illustrating one embodiment of code for execution by the apparatus of FIG. 3A. In one embodiment, the apparatus includes a processor and a memory storing code that is executable by the processor to determine a text selection context for a touchscreen device. The apparatus ascertains whether a text selection override policy is satisfied. The apparatus replaces application text selection rules with one-touch user-defined context-aware text selection rules for the determined text selection context in response to ascertaining that the text selection override policy is satisfied. It will be noted that the term code and/or program/utility may refer to code instructions and/or data, and data structures.

In some embodiments, the code 145 (i.e. program/utility and data) is implemented primarily in software. In some embodiments, the code 145 may also be implemented using combinations of hardware and software. In one embodiment, the code 145 includes a device configuration 330. The device configuration 330 are provided with regard to the description of FIG. 4A. The embodiment 300 may further include a graphical user interface 335 that enables the user to graphically visualize and perform one-touch user-defined context-aware text selection operations.

It will be noted that one-touch user-defined context-aware text selection operations may include touches of varying duration. In some embodiments, a user may define touches of short, medium, and/or long duration. For example, a short duration touch may be a touch that is maintained from about 200 ms to about 500 ms, a medium duration touch may be a test that is maintained from just over 500 ms to about one second, and a long duration touch may be a touch that is maintained from just over one second to about two seconds. The duration of short, medium, and/or long-duration touches may differ from press-and-hold delays defined in an accessibility menu at the operating system level. Moreover, in some embodiments, one-touch may include a touch that is maintained followed by a movement.

In some embodiments, a user may also use the graphical user interface 335 is an interface to a profile manager 345 that enables a user to create, store, retrieve, and/or utilize a user text selection profile 350. In some embodiments, the user-defined context-aware text selection rules are saved to the user text selection profile. In some embodiments, profile manager 345 may manage more than one user text selection profile 350. The user text selection profile 350 stores conditions under which the operating system or application text selection rules will be overridden by user-defined context-aware text selection rules 360.

The user text selection profile 350 may be saved locally on one or more touchscreen devices 105 e.g. or may be saved to server 130 on the network 135. In some embodiments, a user text selection profile or a portion thereof including text selection strategies, text selection rules, and/or content-type parsers, may be imported from another user. Importing a text selection strategy may occur via network 135 or by copying the profile from removable storage media, or by any other method understood in the field of mobile computing for exchanging data.

The user text selection profile 350 may include or refer to an override policy 355. The override policy 355 is used to determine whether or not for any given context the default application text selection rules are overridden by the user-defined context-aware text selection rules 360. In some embodiments, user-defined context-aware text selection rules 360 include text selection strategies 365 that include a set of logical "if-then" context changing patterns and corresponded operation actions based on factors of application purposes, operation history, application relationship, communication partner interaction sequence, culture/language/region changes. In some embodiments, the text selection strategies 365 may be context-aware text selection strategies, meaning that the strategies may vary if the context varies.

In some embodiments, user-defined context-aware text selection rules 360 may further include content-type parsers 368. The content-type parsers 368 enable the processor 310 to apply the determined text selection rules based on the content-type 370 of the text. The content-type parsers 368 may be context-aware and use the touchscreen device's configuration and/or status to select textual content of a given content-type 370. More detailed examples of content-types 370 are described below with respect to FIG. 5C.

Context as used herein, and text-selection context in particular, refers to information, that in addition to and separate from the text itself, that can be used to characterize the situation of a person, place, or object that is considered relevant to the text selection interaction between a user and an application involving a touchscreen device 105, including the user and applications themselves. A system, such as embodiment 300, is context-aware if it uses context to provide relevant text selection information and/or services to the user, where relevancy depends on the user's task.

Thus, as used herein, context-aware text selection refers to text selection for one or more touchscreen devices that uses information about an identity and preferences of a one or more touchscreen device users and information about the location, configuration, and status of the one or more touchscreen devices and application executed by the touchscreen devices to determine how to perform touchscreen text selection operations.

Figure 5A:
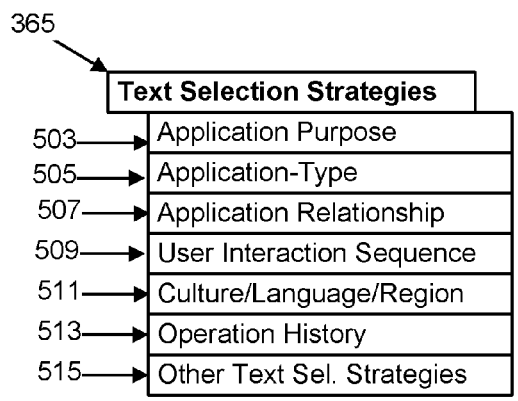
FIG. 5A depicts examples of text selection strategies for user-defined context-aware text selection.
Figure 5B:
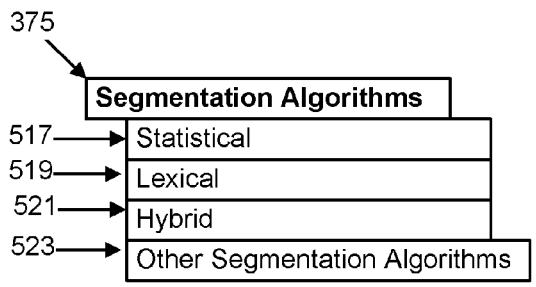
FIG. 5B depicts examples of segmentation algorithms for user-defined context-aware text selection.

Referring to FIGS. 3B and 5B, in some embodiments, user-defined context-aware text selection rules 360 further include segmentation algorithms 375. Text segmentation is the process of providing written text into meaningful units for example such as words, sentences, topics, and/or combinations of characters. Although some languages have explicit word boundary markers such as the spaces between words in written English, some languages require other approaches to text segmentation beyond mere spacing between words. For example, some Chinese texts do not include spaces between characters.

Thus, several different segmentation algorithms 375 may be applied that include delimiter text segmentation rules, statistical text segmentation rules and/or lexical text segmentation rule, or combinations of thereof. Some delimiter text segmentation rules segment textual elements base on spaces or punctuation marks. For example, spaces, newlines, dashes, comma, periods, and so forth. There may be special segmentation rules 375 for different content-type parsers 368. For example, poetry, telephone numbers, addresses, and so forth, may have different segmentation rules associated with content-types 370.

In some embodiments, the processor 310 of embodiment 300 further executes the code 145 which includes a device status monitor 343. The device status monitor 343 may be a program, running in the background (e.g. a daemon) or interrupt driven, that monitors the device status 340 including text selection context events such as social media communication threads, application switching actions, or incoming requests.

Figure 4A:
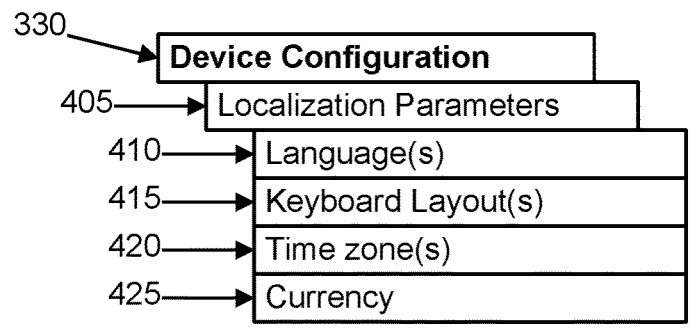
FIG. 4A depicts example embodiments of device configuration elements for user-defined context-aware text selection.
Figure 4B:
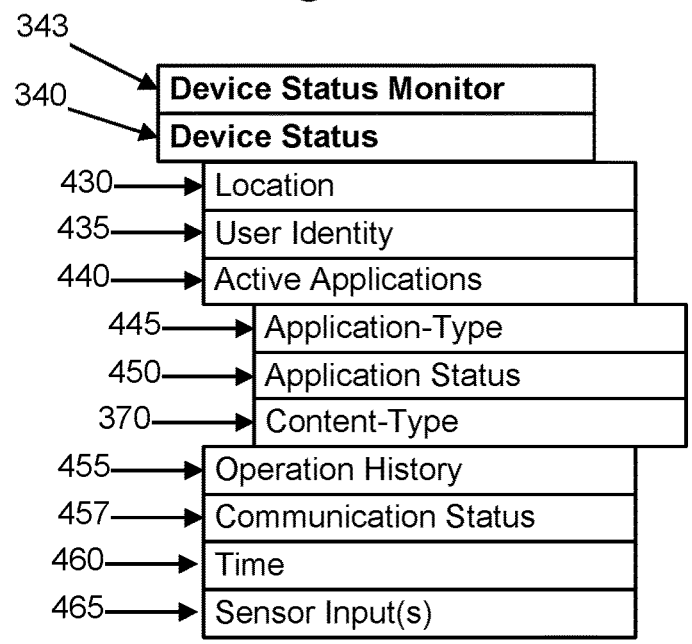
FIG. 4B depicts example embodiments of device status elements for user-defined context-aware text selection.
Figure 4C:
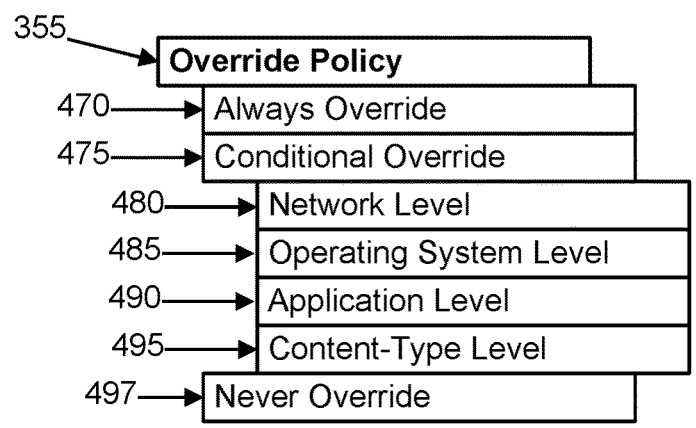
FIG. 4C depicts examples of override policy elements for user-defined context-aware text selection.

Referring now to FIGS. 4A, 4B, and 4C. In some embodiments, the text selection context comprises one or more of a content-type 370, a touchscreen device configuration 330, an application type 445, an application status 450, a communication status 457, and an override policy parameter, e.g. 470, 475, 480, 485, 490, 495, 497. A content-type 370 refers to text of a particular class that has corresponding rules for parsing. For example, names, phone numbers, addresses, poetry, languages, grammatical constructs, symbols, and so forth as depicted and described below with respect to FIG. 5C. A touchscreen device configuration 330 refers to parameters associated with a particular touchscreen device 105. In some embodiments, the device status 340 of a touchscreen device 105 is monitored by device status monitor 343. For example, a current location 430, user identity 435, active application 440, and so forth as depicted and described in more detail below with respect to FIG. 4B. Similarly, override policy 355 parameters are described in more detail below with respect to FIG. 4C.

Figure 5C:
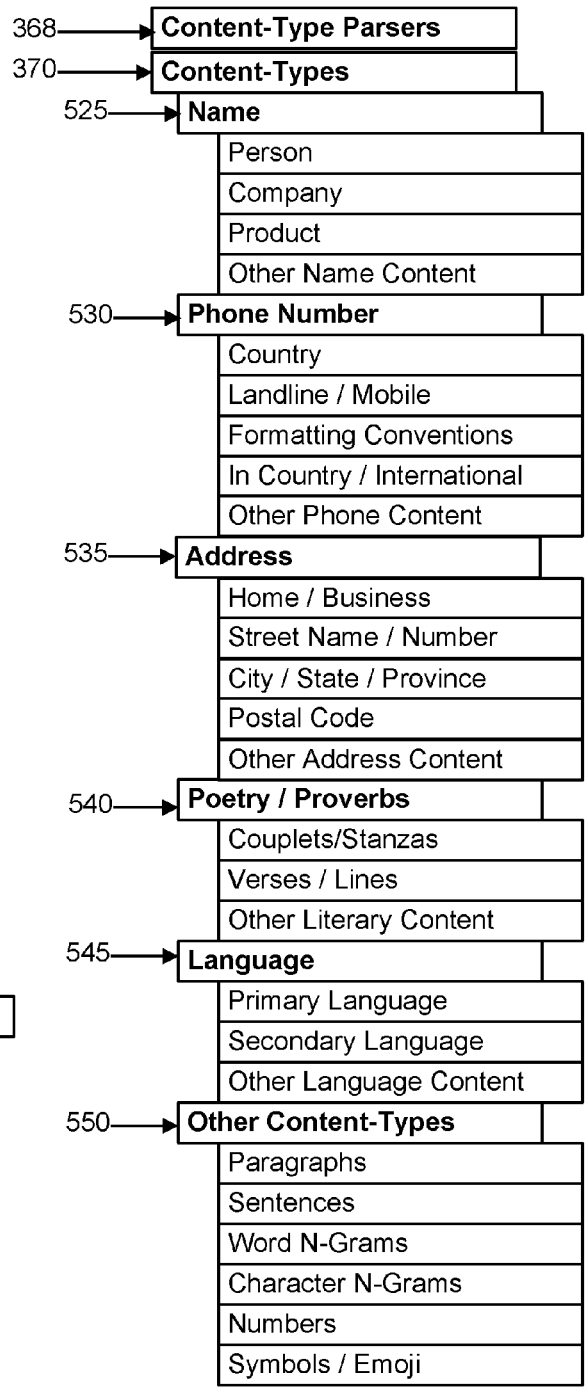
FIG. 5C depicts examples of content-types parsers for user-defined context-aware text selection.

The processor 310 may use any combination of status parameters such as those illustrated in FIGS. 4A-4C and/or FIGS. 5A-5C as part of determining a context for replacing application text selection rules with user-defined context-aware text selection rules 360 in response to an override policy 355 being satisfied.

FIG. 4A depicts example embodiments of device configuration elements for user-defined context-aware text selection. In one embodiment, the text selection context comprises elements selected from the group consisting of content-type 370, touchscreen device configuration, application type, application status, communication status, override policy parameters, and combinations thereof. These context elements are described in more detail with respect to FIGS. 4A-4C, 5A-5C. Device configuration 330 may include, for example, localization parameters 405.

Localization parameters are parameters which generally apply to a particular touchscreen device in the absence of overriding parameters. For example, a touchscreen device 105 may include language 410 setting that specify one or more languages for the operating system and applications to use in association with application text selection. Other localization parameters may be one or more keyboard layouts that are displayed on a virtual keyboard on touchscreen 303 of touchscreen device 105. In some embodiments, one or more time zones 420 may be specified in device configuration 330. Similarly, one or more currencies may be included in device configuration 330.

Typically, device configuration 330 parameters are set manually by a user and modified infrequently. In some embodiments, device configuration 330, also referred to as touchscreen device configuration 330, includes a plurality of localization parameters 405. For example, a bilingual user may configure languages 410 to include a primary language and a secondary language. It will be noted that device configuration 330 may indicate languages 410, keyboard layouts 415, time zones 420, and currencies 425, which are not representative of the localization parameters for the current location 430 of the touchscreen device 105 as shown in device status monitor 343 of FIG. 4B.

FIG. 4B depicts example embodiments of device status elements for user-defined context-aware text selection. In one embodiment, device status monitor 343 monitors one or more locations 430, one or more user identities 435, and/or one or more active applications 440. In some embodiments, the location 430 may be the actual current location of the touchscreen device 105. In some embodiments, the location 430 may be a location input by a user. In some embodiments, the processor 310 uses the user location 430 as part of determining a context to replace application text selection rules with user-defined context-aware text selections rules 360. For example, a user-defined context selection rules 360 may replace application text selection rules if the touchscreen device 105 has a specified location 430 and an override policy 355 is satisfied.

Similarly, the processor 310 may us the user identity 435 as part of determining a context. The user identity 435 may be a user name or a login name that may be an authentication identity. In some embodiments, the processor 310 uses the user identity 435 as part of determining a context to replace application text selection rules with user-defined context-aware text selections rules 360. For example, the same touchscreen device may be used by more than one user or by the same user with multiple login identities. In some embodiments, different user-defined context-aware text selection rules may replace application text selection rules for different users using the same device and/or for the same user using different user identities 435.

Likewise, in some embodiments, the processor 310 uses the active application 440 as part of determining a context to replace application text selection rules with user-defined context-aware text selections rules 360. The status of active applications 440 may include an application type 445 and an application status 450. In some embodiments, the processor 310 monitors at least one application status 450, wherein the determined text selection context to apply is based on the user text selection profile 350 and the at least one application status 450. An application status refers to whether an application is open, active, suspended, a child application, a parent application, and so forth.

In some embodiments, the processor 310 may replace application text selection rules with user-defined context-aware text selection rules for specified active application 440. In other embodiments, processor 310 may replace application text selection rules with the same user-defined context-aware text selection rules for all applications that have the same application type 445.

In some embodiments, device status monitor 343 monitors one or more communication statuses 455, one or more times 460, and/or one or more sensor inputs 465. The communication status 455 may include whether a first touchscreen device e.g. 105a is communicating with a second touchscreen device e.g. 105b or with a server 130. For example, in some embodiments, device status monitor 343 monitors an operation history 513. The processor 310 may use the operation history 513 to replace application text selection rules with user-defined context-aware text selection rules 360, also known as user text selection rules 360, which have been previously applied in a similar context. In some embodiments, the processor 310 may use more than one event from the operation history 513 as part of determining a text-selection context as illustrated in the embodiments described below with respect to FIGS. 6A and 6B.

FIG. 4C depicts examples of override policy 355 and override policy parameters 470-497 for user-defined context-aware text selection. In some embodiments, the processor 310 ascertains that the text selection override policy is satisfied in response to one or more of a specified content-type, a specified application, a specified network status, and a set override policy parameter for the touchscreen device. In other words, if a logical expression that includes specified content-types e.g. 525-550, status e.g. 430-465, network and override policy parameters e.g. 470-497 is true, then the override policy is satisfied.

In some embodiments, the override policy 355 may include an always override parameter 470, that satisfies the override policy 355 and causes the apparatus to apply the user-defined context-aware text selection rules 360, rather than the default application text selection rules or default operating text selection rules. In other embodiments, override policy 355 may be configured to conditionally override 475 application text selection rules with user-defined context-aware text selection rules. The conditional override 475 may override application text selection rules when the touchscreen device 105 is communicating at a network level 480 within a particular network. The conditional override 475 may override application text selection rules at the operating system level 485, meaning that unless otherwise specified, text selection rules for all applications running on a specified operating system on a particular device will be replaced by user-defined context-aware text selection rules.

In one embodiment, the override policy 355 is satisfied if conditional override 475 conditions are met. For example, if the override condition is a network level condition and a first user has an active communication status 455 with a second user on a same network 135, the override condition is satisfied. This can be useful, for example if the first user wants to determine or forward a specified set of user-defined context aware text selection rules for other users communicate on the same network 135.

In other embodiments, application text selection rules for a particular application are replaced by user-defined context-aware text selection rules for particular applications at the application level 490. At the application level 490 applications may also be designated as not to be overridden. In other embodiments, the text selection override policy 355 is satisfied at the content-type level 495 if at least a portion of the text is of a particular content-type 370. A user may also define the override policy size to never override 497 application text selection rules. It will be noted that for purposes of this application being on the same network 135 may not be limited to being on the same physical network. It may also apply to authenticated users in the same domain as one example.

Referring now to FIGS. 5A, 5B, 5C which describe different elements that may be used in defining user-defined context-aware text selection rules. FIG. 5A depicts examples of text selection strategies for user-defined context-aware text selection. In general, text selection strategies 365 have to do with relating to touchscreen device users, the touchscreen devices 105 themselves, applications that are executed on the touchscreen devices 105 and the environment in which users and devices are operating. In some embodiments, a text selection strategy may be to apply the same user-defined context aware text selection rules to applications that have the same application purpose 503. For example, application purpose 503 of an Internet browser application is primarily to read content including textual content. Similarly, the application purpose 503 of an e-book reader application is also primarily to read textual content. Thus, if in the user text selection profile 350 as shown on FIG. 3B, a user defined both browsers and readers as having the same application purpose 503, processor 310 could apply the same text selection rules even though for other purposes browsers and readers may have different application types 505.

In some embodiments, text selection strategies 365 involve an application relationship 507. For example, if a user has been using a mapping application and switches to a contact application or a browser application, user text selection profile 350 may be set up so as to apply an address text selection parser based on the expectation that the user will select an address from the contact application or the browser to paste into the mapping application. In some embodiments, the address text selection is a one-touch user-defined context aware text selection and thus the user avoids having to manipulate the starting handle and the ending handle typically associated with historical text selection on existing touchscreen devices.

In other embodiments, one application is considered to be a parent application and another application is considered to be a child application because the child application is opened directly from the parent application. In such a case, the application relationship 507 may indicate the parent-child relation. In some embodiments, communication partner interaction sequence 509 may form an important part of text selection strategy 365. For example, if a first user has a particular set of text selection rules that are helpful in communication with the second user when the second user receives a communication from the first user the processor 310 of the touchscreen device 105 of the second user may determine that because the first user initiated the communication the text selection rules associated with that particular communication partner interaction sequence 509 should be applied.

In some embodiments, code 145 may include text recognition so that if the text selected corresponds to a keyword or phrase that is meaningful to the user's text selection strategy or rules that meaningful keyword or phrase is used at least in part to help determine the text selection context. For example, if the phrase 'phone number' is selected in an application, then in a subsequent text selection operation involving the same application or a related application according to the user text selection profile 350, the code 145 will attempt to use a phone number 530 content-type parser 368 to perform user-defined context-aware text selection in the application or the related application.

In other embodiments, text selection strategies 365 may include cultural/language/region 511 parameters, whereby the processor 310 may replace application text selection rules with user-defined context-aware text selection rules 360 for a particular culture, particular language, and/or particular region. In some embodiments, the operation history 513 of the touchscreen device 105 and/or individual applications may be used in text selection strategies 365. Other text selection strategies 515 may also be used. Although text selection strategies 365 generally refers to device or user environment factors, it will be noted that text selection strategies 365 and content-type parsers 368 may operate cooperatively and/or may overlap.

FIG. 5B depicts examples of segmentation algorithms for user-defined context-aware text selection. In one embodiment, the one-touch user-defined context-aware text selection rules are selected from the group consisting of statistical segmentation algorithms, lexical segmentations algorithms, hybrid segmentation algorithms, character selection rules, poetry selection rules, phone number selection rules, name selection rules, address selection rules, and combinations thereof. As described above with respect to FIG. 3B, the term 'segmentation algorithms' refers to text segmentation algorithms used to divide written text into meaningful units, such as words, sentences, topics, and so forth. Text segmentation of 375 may include statistical 517 segmentation algorithms, lexical 519 algorithms, and/or hybrid 521 algorithms which use both statistical 517 information as well as lexical of 19 or dictionary-based information.

Other segmentation algorithms 523 may be used in some embodiments. For example, statistical 517 segmentation algorithms for Chinese text uses data such as the mutual information between characters from large sets of training texts to identify likely words formed by combinations of characters. Lexical 519 text segmentation uses morphological rule, syntax rules, semantic rules, and grammatical structures to determine how to segment text. Hybrid 521 text segmentation algorithms use a combination of statistical and lexical algorithms. It will be noted that other segmentation algorithms 523 may be used in some embodiments as the feature of performing user-defined context-aware text selection may be performed with any desired text segmentation algorithm 375.

Segmentation is particularly important in character-based languages which may or may not use punctuation and spacing consistently throughout the text. Moreover, sometimes formal textual rules such as capitalization and punctuation are not used consistently in a particular culture or subculture. For example, some online "texting" culture writing in the English language avoid using capital letters and punctuation. Thus in some embodiments, application type 505 and culture/language/region 511 may affect the preferred segmentation algorithms 375. If the text segmentation is incorrect then the text selection may not make sense.

FIG. 5C depicts examples of content-types 370 for user-defined context-aware text selection. In some embodiments, content-type parsers 368 may be used to parse, i.e. syntactically analyze the text according to rules associated with the content-type 370. The content-type parsers 368 may include text selection rules for the specified content-type 370, e.g. character selection rules, poetry selection rules, phone number selection rules, name selection rules, address selection rules and so forth. It will be understood that content-type parser 368, e.g. 525, 530, 535, 540, 545, 550, operate on corresponding content-types without the need to depict each content-type parser 368 and content-type 370 individually and separately.

In some embodiments, content-type parsers 368 may include a name parser 525. The name parser 525 may include name text selection rules. For example, in English and some other Western alphabetic languages, proper nouns, including names, generally begin with a capital letter. Yet, words at the beginning of a sentence also begin with capital letters. Thus a name parser may analyze the position of a capitalized word within a sentence by looking at punctuation and spacing. In other languages parsing of names often involves comparing character phrases, variable-length character groups or variable-length groups of letters with a dictionary of names. This could apply to names of persons, companies, products or other proper nouns. As explained above with respect to FIG. 5B, in "texting" culture, segmentation rules may be altered with regard to capitalization and punctuation to accommodate possible lack of punctuation and/or capitalization. Such alteration, may include for example, using a name dictionary.

In some embodiments, the content-type parser 368 may include a phone number parser 530. Phone number parsers 530 may include rules for: determining country codes, whether the phone number is a landline phone number or a mobile phone number, and whether there are formatting conventions such as parentheses around an area code as was frequently done in the United States, spacing or dashes between different segments of a phone number. In some embodiments, a phone number parser 530 knows how to distinguish between the format for an in country phone number and a phone number to be accessed from another country. Other phone content may relate to whether it is a business phone number, home phone number, or any information relevant to a user and application on a touchscreen device.

In some embodiments, text selection rules apply to poetic or literary content such as poetry and/or proverbs 540. In some embodiments, a user may configure a user text selection profile 350 to select text in poetic form. For example, if the content-type 370 is determined to include poetry or proverbs, the processor 310 may ascertain that a text selection override policy 355 is satisfied and may replace an application text selection rules with user-defined context-aware text selection rules 360 that includes a poetry/proverb parser 540 to detect poetry content-type and provide information that can be used in poetry text selection rules. Poetry content-types and parser may vary depending on the language and/or the type of poetry.

For example, in the Chinese language, Tang poetry includes diverse text selection possibilities. The ancient-style verse basically includes five-character and seven-character poetry, while the modern-style verse includes two categories: four-lined and eight-lined, which can be further categorized into five-character and seven-character poetry. Thus, basic forms of Tang poetry include five-character ancient verse, seven-character ancient verse, five-character four-lined poetry, seven-character four-lined poetry, five-character eight-lined poetry and seven-character eight-lined poetry. Accordingly, in some embodiments, content-type parsers 368 may include poetry/proverb 540 parsers that parse the poetry according to selected rules.

In one embodiment, content-type parsers 368 includes a language parser that determines the language of textual content. In some cases, a significant portion of the content may be in a primary language but certain words may be in a second language. For example, the primary text may be in Chinese, but a certain word or phrase which originated in English may be displayed using English alphabetic characters. Thus, a language 545 content-type parser 368 may be used to select text of a second language that is embedded within text of a first language. Many other content-types 550 may be useful for text selection. For example, emoji, or emoticons, are typically ideographic characters. In some cases, emoji are formed by combinations of punctuation symbols. In some embodiments, a content-type parser 368 may recognize emoji as separate textual units and appropriately select the correct number of symbols or characters.

Figures 6A, 6B:
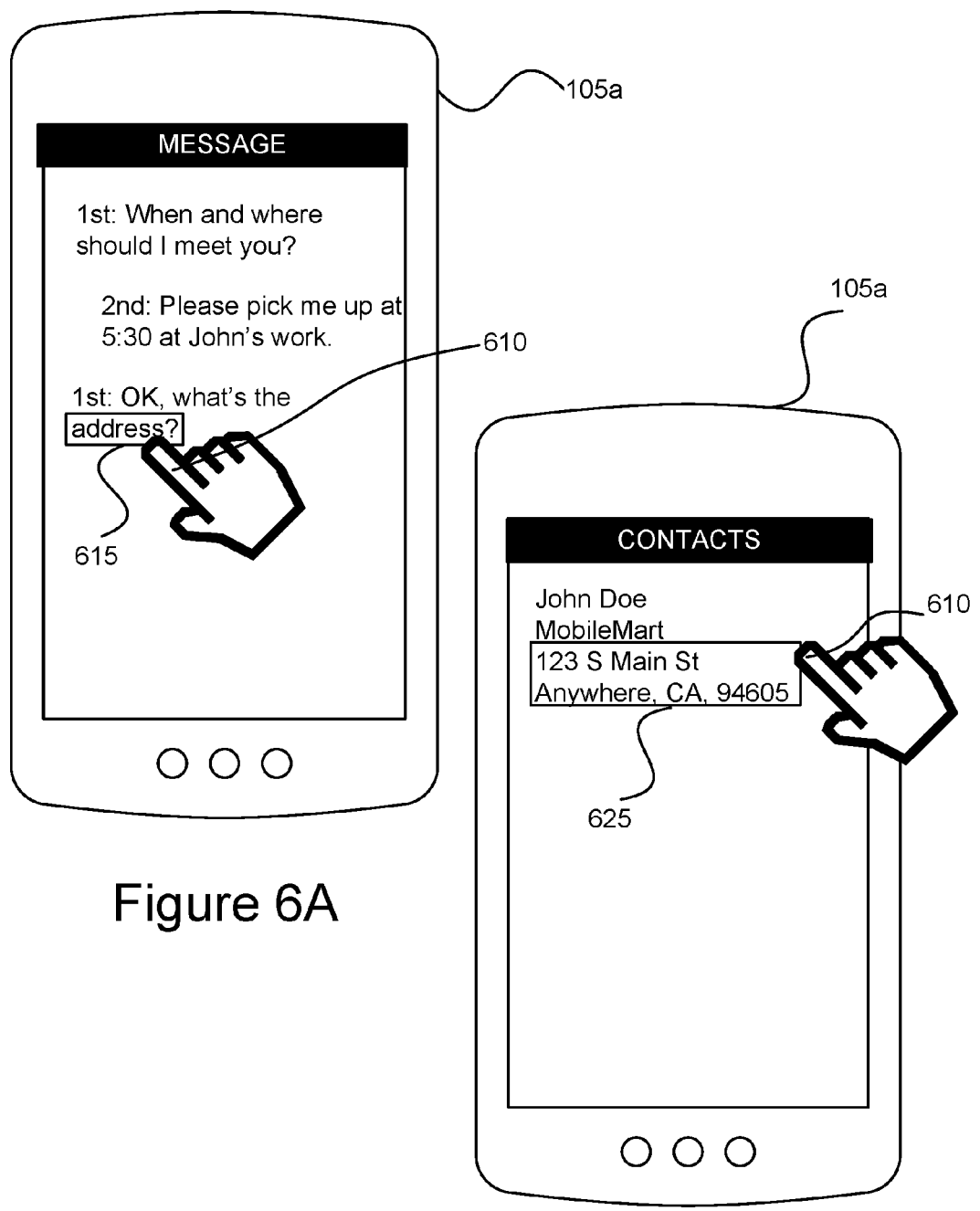
FIG. 6A depicts one embodiment of a text selection on a touchscreen device.
FIG. 6B depicts another embodiment of a user-defined context-aware text selection on a touchscreen device based on the embodiment of FIG. 6A.

FIG. 6A depicts one embodiment of a text selection on a touchscreen device. In some embodiments, application text rules for at least two different applications are replaced with the user-defined context-aware text selection rules 360. Moreover, the at least two different applications may be from different vendors. The ability to define and apply user-defined context-aware text selection rules to different applications from different vendors enables a user to create a user text selection profile 350 that uniformly meets his or her text selection preferences and overrides application text selection rules and override policy 355 set by the user is satisfied.

In an embodiment depicted in FIG. 6A, a user 610 touches the touchscreen of touchscreen device 105 at a point 615 above the word 'address' on the display. In the example depicted, the default text selection rule for a messaging application is to select the entire response. A user 610 has created a user text selection profile 350 whereby for messaging applications the user text selection rule 360 is one-word N-gram (i.e. unigram) text selection. Additionally, in the user text selection profile 350, a text selection strategy 365 defines an application relationship 507 between a first application type 505 for messaging and a second application type 505 for contacts.

Thus, having selected the word 'address' in the first (messaging) application, when the user 610 switches to a contact application as shown in FIG. 6B on the same touchscreen device 105a, the processor 310 determines the context having recognized the word 'address' in the messaging application of FIG. 6A, and replaces the default application text selection rules for the contacts application with user-defined context-aware text selection rules that select only a portion 625 of the address that includes the street address, city name, state name and ZIP Code of the address 535, provided that the override policy 355 is satisfied for the determined context.

It will be noted that in many cases a one-touch user-defined context-aware application will improve the speed and convenience with which text may be selected. In some embodiments, a user may desire to use a traditional start handle and end handle text selection, e.g. as sometime found in application text selection rules. Such rules may be used in combination with one-touch user-defined context-aware text selection rules. In some embodiments, a graphical user interface 335 may allow a user to set on clear an override policy 355 parameter. That could also be accomplished by for example a voice interface.

Figure 8:
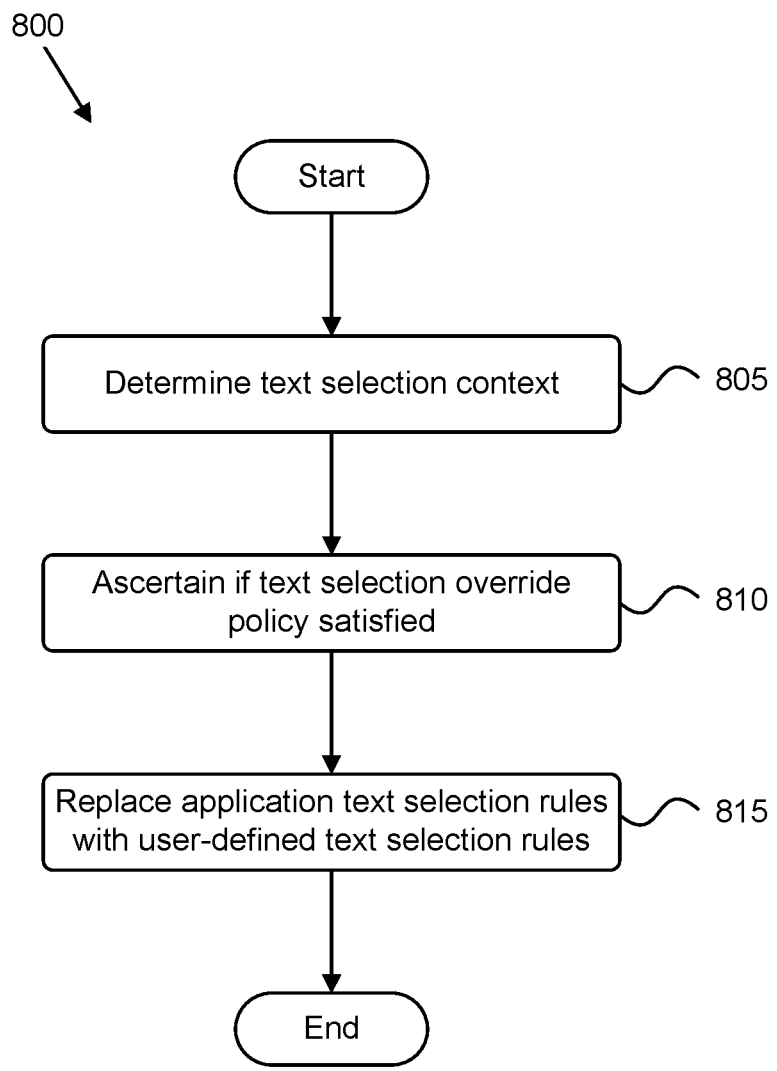
FIG. 8 depicts an embodiment of a method for user-defined context-aware text selection for touchscreen devices.

In one example embodiment depicted in FIGS. 7A, 7B, with reference also to FIGS. 1, 3A-B, 4A-C, 5A-C, 8, and 9, a system 700 similar to that of system 100 shown in FIG. 1) is disclosed that replaces application text selection rules with one-touch user-defined context-aware text selection rules in response to determining the text selection context and ascertaining that an override policy is satisfied in accordance with the method 800 shown in FIG. 8. The system 700 includes a first wireless touchscreen device 105a and a second wireless touchscreen device 105b. Each of the touchscreen devices 105a and 105b is adaptable to connect to a network, such as network 135 shown in FIG. 1, that transfers data between the first wireless touchscreen device 105a and the second wireless touchscreen device 105b.

The first touchscreen device 105a includes a processor 310 that executes code 145 that determines a first text selection context for the first wireless touchscreen device 105a. For example, code 145 included in the first wireless touchscreen device 105a may determine that a first user 705 has configured the first wireless touchscreen device 105a to have a device configuration 330 that includes the Chinese language as a primary language. A device status monitor 343 detects through an I/O interface 325 such as a GPS interface that the first wireless touchscreen device 105a and a first user 705 are currently located in China.

The processor 310 uses code 145 included in touchscreen device 105a to determine that user 705 has created a user text selection profile 350 using profile manager 345. The user 705 has also set up an override policy 355 that overrides an application's text selection rules, e.g. one-character N-gram text selection, for a browser application type 505 with user-defined context-aware text selection rules 360 when the first wireless touchscreen device 105a is located in China and the language 410 is configured as the primary language and device configuration 330.

The code 145 of the second touchscreen device 105b, determines a second text selection context for the second wireless touchscreen device 105b being used by a second user 730. The second user 730 has configured touchscreen device 105b to have English as a language 545, e.g. a primary language. The second user 730 has also configured touchscreen device 105b to replace application text selection rules for a browser application type 505. Additionally, a user text selection profile 350 for touchscreen device 105b also includes a text selection strategy 365 to select text based on a communication partner interaction sequence 509 with another user at the network level 480 such that the other users text selection rules will be matched on touchscreen device 105b taking into account text selection rules specific to the primary language configured for touchscreen device 105b.

The first user 705 has also configured touchscreen device 105a to use poetry text selection rules, which for traditional Chinese poetry recognizes groups of seven characters as a unit of text to be selected. The first user 705 touches the screen of touchscreen device 105a and the processor 310 of touchscreen device 105a determines the text selection context includes a portion of text with a poetry content-type. Processor 310 of touchscreen device 105a also ascertains that the text selection override policy is satisfied for touchscreen device 105a. In response, a poetry content-type parser 540 segments the poetry content-type text into seven character lines and highlights the selected characters 715.

On the second touchscreen device 105b which is configured to follow the user-defined context-aware text selection rules 360 of another user that is in communication with touchscreen device 105a at the network level 480, ascertains that the text selection override policy is satisfied for the second touchscreen device 105b. In response, the processor 310 of touchscreen device 105b replaces the application text selection rules with user-defined context-aware text selection rules 360 for poetry content-type 540. Because touchscreen device 105b is configured for English as the primary language, the segmentation algorithms 375 for English, segment the text by lines rather than by number of characters. Thus, as shown in FIG. 7B, touchscreen device 105b displays a highlighted portion of text 720 corresponding to the selected characters 715 of text 710 on touchscreen device 105a. When the second user 730 touches the highlighted portion 725, the highlighted portion 725 is selected with one-touch based at least in part on the user text selection rules 360 of the first touchscreen device 105a, i.e. text selection rules for a poetry content-type.

FIG. 8 depicts an embodiment of a method for user-defined context-aware text selection for touchscreen devices. In one embodiment, method 800 determines 805 a text selection context for a touchscreen device 105. For example, by evaluating the device configuration 330 and/or the device status monitor 343, as well as information such as text selection strategies 365, content-type, communication status 457, and so forth, that may be relevant to determining a text selection context. In response to determining 805 the text selection context, the method 800 further ascertains 810 if a text selection override policy is satisfied as described above with respect to FIG. 4C. The method 800 replaces 815 application text selection rules with user-defined context-aware text selection rules 360 in response to ascertaining that the text selection override policy 355 is satisfied.

Figure 9:
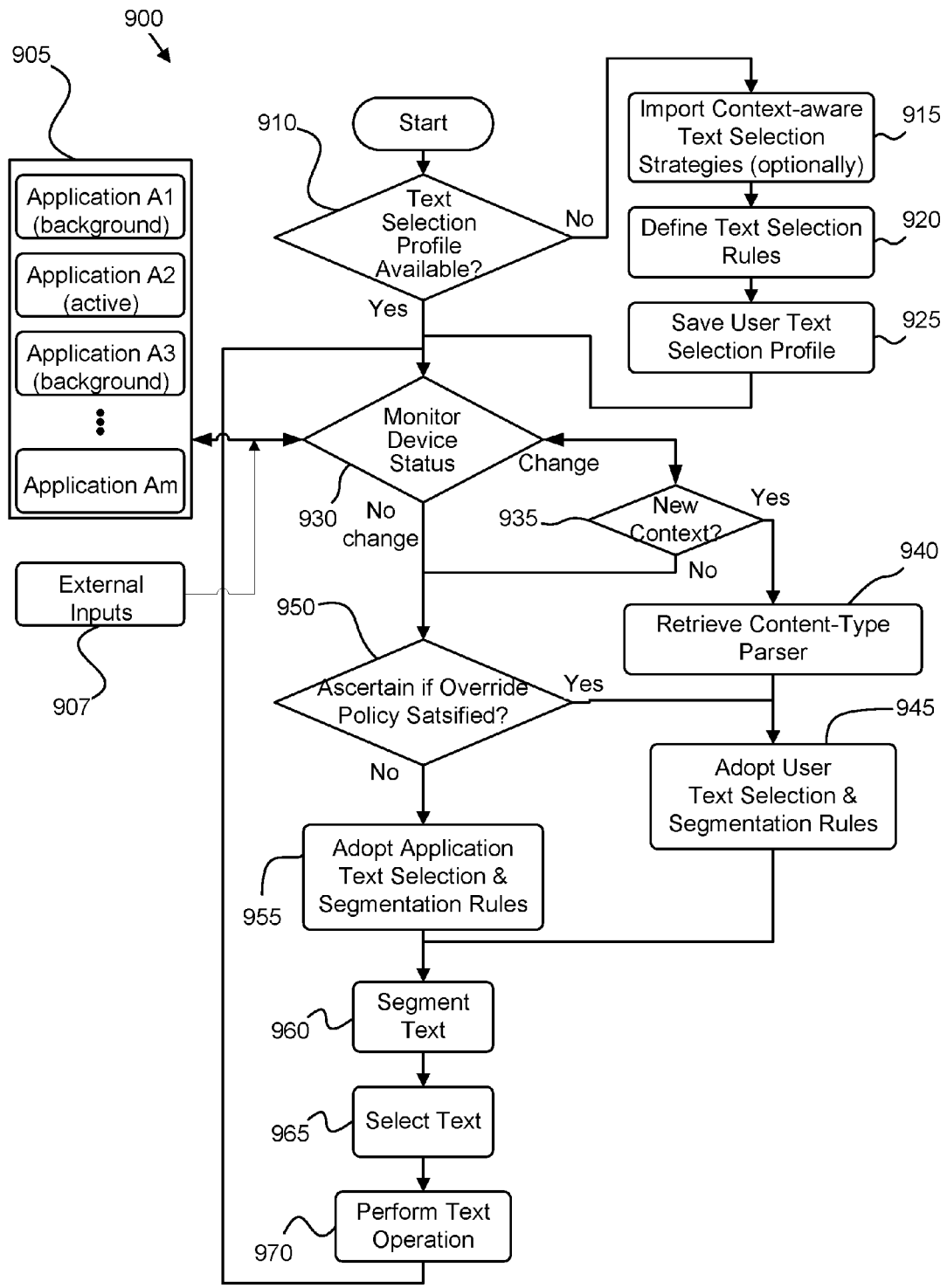
FIG. 9 depicts another embodiment of a method for user-defined context-aware text selection for touchscreen devices.

FIG. 9 depicts an embodiment of a method for user-defined context-aware text selection for touchscreen devices. In one embodiment, method 900 determines 910 whether a text selection is available. If no user text selection profile is available, a user may optionally import 915 context-aware text selection strategies from other users, that may be sent individually or archived in a library of text selection strategies. A user may also define 920 his or her own text selection rules in addition to imported text selection rules or strategies. Method 900 then saves 925 the user text selection profile to the memory 320 or to some other location on an external device 327, or to a location accessible via network 135.

In one embodiment, method 900 may monitor 930 a device status using device status monitor 343. The device status monitor 343 may be an event handler or other program segment that monitors active locations and background applications 905, as well as external inputs 907 and determines for example if an application has switched whether a new context 935 exists. If a new context exists method 900 retrieves 940 appropriate content-type parsers for the content-type of the new context. The method 900 ascertains 950 whether an override policy 355 is satisfied and whether to override the application text selection rules.

If the override policy 355 is satisfied, the method 900 then adopts 945 user text selection rules 360 and segmentation algorithms 375. If the override policy 355 is not satisfied, the method 900 adopts 955 or retains application text selection and segmentation algorithms. In one embodiment, method 900 then segments 960 and selects 965 the text according to the adopted user text selection rules 360 and segmentation algorithms 375. In some embodiments, method 900 then performs 970 a text operation, such as to copy, or cut the selected text. In some embodiments, method 900 continues to monitor 930 the device status. Thus, a flexible, improved method for defining, managing and using user-defined context aware text selection rules for touchscreen devices 105.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor; and
   a memory storing code that is executable by the processor to:
   determine a text selection context for a touchscreen device;
   ascertain whether a text selection override policy is satisfied; and
   replace application text selection rules with one-touch user-defined context-aware text selection rules for the determined text selection context in response to ascertaining that the text selection override policy is satisfied, wherein application text selection rules for at least two different applications are replaced with the one-touch user-defined context-aware text selection rules.

2. The apparatus of claim 1, wherein the text selection context comprises elements selected from the group consisting of content-type, touchscreen device configuration, application type, application status, communication status, override policy parameters, and combinations thereof.

3. The apparatus of claim 1, wherein the at least two different applications are from different vendors.

4. The apparatus of claim 2, wherein the text selection override policy is satisfied in response to a logical expression of parameters for the touchscreen device selected from the group consisting of content-type, application type, application purpose, application status, network status, override policy, and combinations thereof.

5. The apparatus of claim 2, wherein the one-touch user-defined context-aware text selection rules are selected from the group consisting of statistical segmentation algorithms, lexical segmentations algorithms, hybrid segmentation algorithms, character selection rules, poetry selection rules, phone number selection rules, name selection rules, address selection rules, and combinations thereof.

6. The apparatus of claim 5, wherein the one-touch user-defined context-aware text selection rules include at least one context-aware text selection strategy selected from the group consisting of application purpose, operation history, application relationship, communication partner interaction sequence, culture, language, and region.

7. The apparatus of claim 6, wherein the at least one context-aware text selection strategy is imported from another user.

8. The apparatus of claim 2, wherein the processor further applies a plurality of different text segmentation algorithms.

9. The apparatus of claim 2, the processor further parsing one or more content-types selected from the group consisting of names, phone numbers, numbers, addresses, languages, sentences, phrases, poetry, variable-length character groups, and combinations thereof.

10. The apparatus of claim 9, wherein the user-defined context-aware text selection rules are saved to a user text selection profile.

11. The apparatus of claim 10, wherein the processor further monitors at least one application status, wherein the determined text selection context to apply is based on the user text selection profile and the at least one application status.

12. A method comprising:
    determining, by use of a processor, a text selection context for a touchscreen device;
    ascertaining whether a text selection override policy is satisfied; and
    replacing application text selection rules with user-defined context-aware text selection rules for the determined text selection context in response to determining that the text selection override policy is satisfied, wherein application text selection rules for at least two different applications are replaced with the user-defined context-aware text selection rules.

13. The method of claim 12, wherein the text selection context comprises elements selected from the group consisting of content-type, touchscreen device configuration, application type, application status, communication status, override policy parameters, and combinations thereof.

14. The method of claim 13, wherein the at least two different applications are from different vendors.

15. The method of claim 12, wherein the text selection override policy is satisfied in response to a logical expression of parameters for the touchscreen device selected from the group consisting of content-type, application type, application purpose, application status, network status, override policy, and combinations thereof.

16. The method of claim 12, wherein the user-defined text selection rules comprise one-touch text selection rules and rules selected from the group consisting of override policy rules, statistical rules, lexical rules, character selection rules, poetry selection rules, phone number selection rules, a name selection rules, address selection rules, and combinations thereof.

17. The method of claim 12, wherein the user-defined text selection rules include at least one context-aware text selection strategy selected from the group consisting of application purpose, operation history, application relationship, communication partner interaction sequence, culture, language, region, and a text-selection strategy imported from another user.

18. The method of claim 12, further comprising parsing one or more content-types selected from the group consisting of names, phone numbers, numbers, addresses, foreign languages, sentences, phrases, poetry, characters, character phrases, and combinations thereof.

19. A system comprising:
  a first wireless touchscreen device;
  a second wireless touchscreen device;
  a network that transfers data between the first wireless touchscreen device and the second wireless touchscreen device; and
  text selection code for execution by processors in the first and second wireless touchscreen devices that:
    determines a first text selection context for the first wireless touchscreen device;
    determines a second text selection context for the second wireless touchscreen device;
    ascertains whether a first text selection override policy is satisfied for the first wireless touchscreen device;
    ascertains whether a second text selection override policy is satisfied for the second wireless touchscreen device;
    replaces application text selection rules for the first touchscreen device with first user-defined text selection rules for the determined first text selection context in response to ascertaining that the first text selection override policy is satisfied, wherein application text selection rules for at least two different applications are replaced with the first user-defined text selection rules; and
    replaces application text selection rules for the second touchscreen device with second user-defined text selection rules for the determined second text selection context in response to ascertaining that the second text selection override policy is satisfied, wherein at least a portion of the second user-defined text selection rules are based the first user-defined text selection rules.

* * * * *